United States Patent [19]

Makabe et al.

[11] 4,315,472
[45] Feb. 16, 1982

[54] ELECTRONIC SEWING MACHINE

[75] Inventors: Hachiro Makabe, Fussa; Kazuo Watanabe, Hachioji; Hideaki Takenoya, Hachioji; Eiichi Shomura, Hachioji; Yoshinobu Tonomura, Hachioji, all of Japan

[73] Assignee: Janome Sewing Machine Co. Ltd., Tokyo, Japan

[21] Appl. No.: 131,357

[22] Filed: Mar. 18, 1980

[30] Foreign Application Priority Data

Mar. 26, 1979 [JP] Japan .................................. 54-35213

[51] Int. Cl.$^3$ .............................................. D05B 3/02
[52] U.S. Cl. .................................. 112/158 E; 112/277
[58] Field of Search .......... 112/158 E, 121.12, 121.11, 112/275, 277

[56] References Cited

U.S. PATENT DOCUMENTS 4,103,632  8/1978  Bowles ............................ 112/158 E
4,108,093  8/1978  Watanabe et al. ............... 112/158 E
4,196,683  4/1980  Eguchi ............................ 112/158 E

FOREIGN PATENT DOCUMENTS

2903031  8/1979  Fed. Rep. of Germany ... 112/158 E

Primary Examiner—Peter P. Nerbun
Attorney, Agent, or Firm—Michael J. Striker

[57] ABSTRACT

When a pulse motor in an electronic sewing machine is to be subjected to a heavy load, the pulse motor is operated at a slower speed in order to cause the pulse motor to operate at a rate in which it has a maximum torque output. For lesser load conditions, pulse motor speed is allowed to increase. Speed control of the pulse motor follows a generally trapezoidal curve, which curve includes a speed-up section and a slow-down section, and may include a flat section. That portion of the generally trapezoidal curve along which motor speed follows is determined by the distance which the pulse motor is required to move.

4 Claims, 11 Drawing Figures

① Start

② Calculation of difference between new coordinate and existing coordinate

③ Difference is 0

④ Reg 5 is set to 24 Difference is stored into Reg 6

⑤ Reg 6 ≥ 64

⑥ Reg 6 ≥ 16

⑦ Reg 6 × 3/8 is stored into Reg 5

⑧ Reg 6 − 2 × Reg 5 is stored into Reg 4

⑨ Reg 5 − 1 is stored into Reg 5

⑩ Value of Reg 6 is changed to 2

⑪ Destination of INT is directed to INT 1

⑫ INT

⑬, ⑭ End

⑮ Return

⑯ Value of Reg 5 is changed to 4

⑰ Reg 6 > 8

⑱ Destination of INT is directed to INT 3

FIG. 9

① Start
② Machine motor is stopped
③ Machine motor is kept stopped
④ Straight stitching
⑤ Calculation of difference between clutch coordinate and existing coordinate
⑥ Difference is 0
⑦ Clutch solenoid is energized
⑧ Reg6 ← 30
⑨ Needle drop hole control
⑩ Reg6 ← 78
⑪ Destination of INT is directed to INT 4
⑫ I N T
⑬ End
⑭ End
⑮ Return
⑯ Reg6 ← 30
⑰ Needle drop hole control
⑱ Reg6 ← 78
⑲ Destination of INT is directed to INT 5
⑳ I N T

FIG. 10

① Start
② Jump to designated INT
③ Pulse motor drive routine
④ Initial value of slow-up curve is set to Acc
⑤ Reg6 ← Reg6+1
   Reg5 ← Reg5-1
⑥ Reg5 = 0
⑦ Directed to INT2
⑧ Acc + Reg6 is set to Acc, and the corresponding data is read out from ROM to set timer counter
⑨ Timer counter is started
⑩ Return
⑪ Pulse motor drive routine
⑫ Reg4 ← Reg4-1
⑬ Reg4 = 0
⑭ Directed to INT3
⑮ Initial value of slow-down curve is set to Acc
⑯ Return
⑰ Pulse motor drive routine
⑱ Reg6 ← Reg6-1
⑲ Reg6 = 0
⑳ Pulse motor drive routine
㉑ Reg6 ← Reg6-1
㉒ Reg6 = 0
㉓ 1.25mS is set to timer counter
㉔ Timer counter is started
㉕ Return
㉖ Return
㉗ Clutch solenoid is deenergized
㉘ Machine motor is released from standstill condition
㉙ Return
㉚ Pulse motor drive routine
㉛ Reg6 ← Reg6-1
㉜ Reg6 = 0

FIG. 11

ELECTRONIC SEWING MACHINE

BACKGROUND OF THE INVENTION

1. Field of the Invention

This invention relates to an electronic sewing machine, and more particularly relates to a sewing machine having an electronic memory which stores pattern data for producing selected stitch patterns by way of pulse motor controlled stitch forming devices. Such a sewing machine employs two clutches, the first arranged between one of the pulse motors and a needle hole changing mechanism, and the second arranged between another pulse motor and a feed dog dropping mechanism, so that the pulse motors may change to needle hole and feed to cloth in accordance with the stitch desired.

2. Description of the Prior Art

When the upper shaft of a sewing machine is rotated at 1000 rpm to stitch a pattern, the time required for one rotation is 60 mS (milliseconds). Therefore, it is necessary to drive the pulse motors which drive the needle and feed dog each 20 mS, which is less than the time required for the upper shaft to rotate 180°. Since it may take as many as 78 steps for the pulse motor to go between extreme positions, the pulse motors must be rotated at a high speed. In this case, the output torque of a pulse motor need only exceed the sum of (a) the torque required to overcome inertia of both the driven load and the pulse motor itself and (b) the torque required to overcome friction resistance. This output torque may be relatively small. On the other hand, for operation of the needle hole changing mechanism or the feed dog dropping mechanism, the output torque of the pulse motor must exceed both the torque requirements listed above and a further resistance torque caused by the frictional load and springs. This latter case requires considerably greater output torque, in comparison with the torque required only to stitch a pattern. Therefore, if the pulse motor is rotated at a high speed, as it does when producing a stitch, output torque of the pulse motor is reduced. If the output torque of the pulse motor is to be increased at high speed, it becomes necessary to provide a larger pulse motor. This is, however, very inconvenient in view of the limited space within a sewing machine.

The present invention has been provided to solve this problem.

SUMMARY OF THE INVENTION

According to the invention, pulse motor speed control follows a generally trapezoidal curve composed of a speed-up section, a flat section and a slow-down section, each of which are determined by the number of steps which the pulse motor is to take.

In case the pulse motor bears a comparatively heavy load, while operating the needle hole changing mechanism or the feed dog dropping mechanism, a comparatively low speed range is employed near the maximum output of the pulse motor. Thus, the same pulse motor that is used to stitch patterns may be used to operate both the needle hole changing mechanism and the feed dog dropping mechanism. Moreover, the pulse motor need not be bulky.

Additionally, output torque is reduced at high speed while patterns are stitched, which reduces noise.

The other features and advantages of the invention will be apparent from the following description of the preferred embodiment of the invention, which description proceeds with reference to the attached drawings.

DESCRIPTION OF THE PREFERRED EMBODIMENTS

Figure 1:
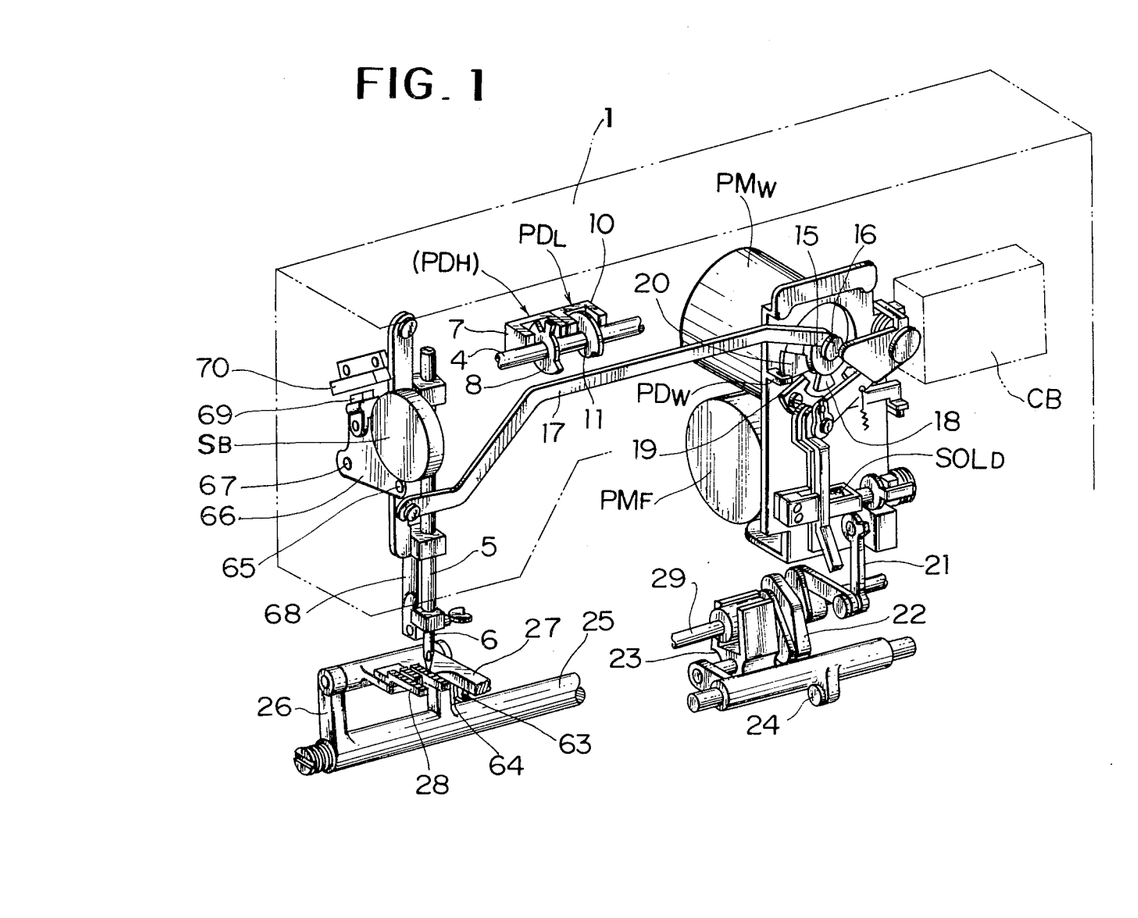
FIG. 1 and FIG. 2 are perspective views showing mechanical elements in a sewing machine which uses the invention.
Figure 2:
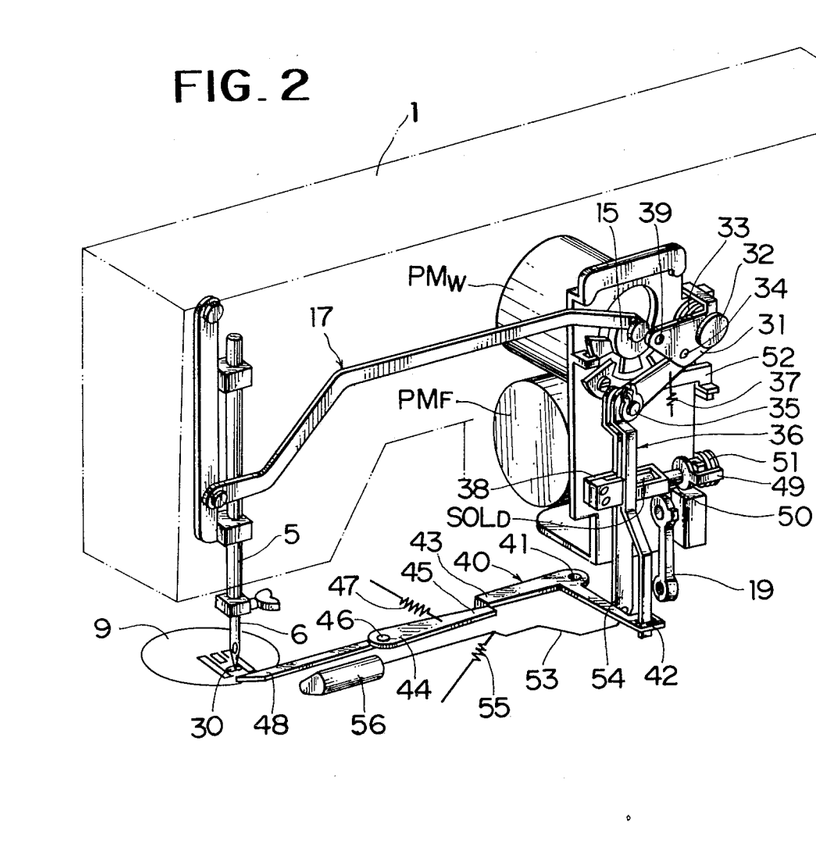

Referring firstly to FIGS. 1 and 2, numeral 4 is an upper shaft of a sewing machine, which rotates within machine housing 1 and is driven by a machine motor (not shown) to reciprocate needle bar 5 and needle 6. $PD_H$ is a pulse generator for detecting when needle 6 is above the work, proper time for changing lateral needle position and operating the changing mechanism. Pulse generator $PD_H$ is composed of a photoemitting device 7 secured to machine housing 1, and a photo interruptor 8 secured to upper shaft 4, and issues a high signal at a predetermined angular position of upper shaft 4 when needle 6 is above needle plate 9. $PD_L$ is a pulse generator for detecting when needle 6 is below the work to detect the proper time for altering fabric feed and operating the feed dog dropping mechanism. Pulse generator $PD_L$ is likewise composed of a photoemitting device 10 and a photo interruptor 11, and issues a high signal at a predetermined angular position of upper shaft 4 when needle 6 is under needle plate 9. These two pulse generators $PD_H$ and $PD_L$ are the same as those described by the inventors here in Japanese Utility Model Application No. 132,858/77. CB is a housing for control circuitry described below. $PM_W$ is a pulse motor for moving needle bar 5 laterally through transmission rod 17. Transmission rod 17 is connected at one end to a movable needle support in a well known fashion, and is connected at its other end to a motor shaft 16 through link 15. Link 15 has a projection 18 which is limited in its rotation by stop 19. Numeral 20 is a photo interruptor segment secured to shaft 16, which cooperates with a photoemitting device $PD_W$ to detect the lateral position of needle 6. $PM_F$ is a pulse motor for controlling feed, namely the horizontal toward and rearward movement of feed dog 28, via link 21. Link 21 is connected by a belt to the shaft (not shown) of pulse motor $PM_F$, and is further connected to a transmission including feed regulator 22, fork rod 23, transmission shaft 25, vertical arms 26, and feed dog bed 27. Numeral 29 is a lower shaft which is rotated in synchronism with upper shaft 4 to rotate a thread loop taker (not shown). Pulse motor $PM_F$ is provided with a photo interruptor segment (not shown) in the same fashion as in pulse motor $PM_W$, and detects the position of feed adjuster 22 is cooperation with photoemitting device $PD_F$, described later. Turning to FIG. 2, the pulse motor $PM_W$ also serves to change needle hole 30 in needle plate 9 to a lateral oblong hole for stitching patterns and to a circular hole for stitching straight stitches. The dial thereof is the same as that described by the inventors here in Japanese Patent Application No. 7,680/78. Numeral 31 is a needle hole changing arm pivoted around shaft 32 which rotate parallel to shaft 16. Arm 31 is normally biased toward a user (not shown) by spring 33. Although not shown in FIG. 2, shaft 32 is connected with the plunger of a later mentioned solenoid $SOL_N$, which when energized moves arm 31 toward pulse motor $PM_W$ against spring 33. Arm 31 is provided with an engaging pin 34 which is connected to one end of bent lever 36. Lever 36 is pivoted at its center, and is biased clockwise by tension spring 37 until lever 36 is stopped by stop 38. Spring 37 also biases arm 31 counterclockwise. Arm 31 is also provided with pin 39. When lever 36 contacts stop 38 after link 15 causes transmission rod 17 to move needle bar 5 to its rightmost position (the maximum clockwise position of pulse motor $PM_W$) solenoid $SOL_N$ is energized. This displaces arm 31 toward pulse motor $PM_W$, where pin 39 engages link 15 to transmit the rotation of pulse motor $PM_W$ to arm 31 and thereby change needle hole 30 to a circular hole for straight stitches. Afterwards, solenoid $SOL_N$ is deenergized. In any condition other than that mentioned above, arm 31 cannot be moved forwardly as seen in FIGS. 1 or 2 and maintains engagement with pulse motor $PM_W$, even if solenoid $SOL_N$ is deenergized. Numeral 40 is an intermediate lever which is pivoted at point 41 to machine housing 1 and connected at end 42 to lever 36. The end 43 of intermediate lever 40 touches end 45 of lever 44. Lever 44 is pivoted at point 46 to machine housing 1 and is biased counterclockwise by spring 47. Spring 47 acts to bias end 48 of intermediate lever 40 forwardly. FIG. 2 shows that end 48 is moved forwardly to provide an oblong hole 30 in needle plate 9 for zigzag stitching. Lever 44 is rotated in clockwise direction from the position shown, so that an auxiliary needle plate (not shown) at end 48 partially covers needle hole 30 to provide the circular hole for straight stitching. This rotation of lever 44 is caused by rotation of pulse motor $PM_W$. Pulse motor $PM_F$ (not shown in FIGS. 1 and 2) serves to make feed dog 28 inoperative upon selection of basting stitches. The details of such operation are the same as described by the inventors here in Japanese Utility Model Application No. 8,268/78. Numeral 49 is a feed dog changing arm which is rotatably pivoted around shaft 50 moving therewith parallel to shaft of pulse motor $PM_F$ and which is provided with spring 51. Shaft 50 is connected to a plunger (not shown) of a solenoid $SOL_D$ and is moved leftwards together with arm 49 against spring 51 when solenoid $SOL_D$ is energized. Numeral 52 is a lever pivoted at point 35. Although not shown, arm 49 is releasably engaged with pulse motor $PM_F$ (as is changing arm 31) and transmits rotation of pulse motor $PM_F$ to lever 52. Thus, after lever 52 contacts the stop 38, and when solenoid $SOL_D$ is energized and pulse motor $PM_F$ rotated to its maximum clockwise position, rotation of pulse motor $PM_F$ is transmitted to arm 49. By rotation of pulse motor $PM_F$, feed dog 28 is dropped below needle plate 9, and solenoid $SOL_D$ is subsequently deenergized. In any other condition, arm 49 is kept in engagement with pulse motor $PM_F$, even if solenoid $SOL_D$ is deenergized. Numeral 53 is a plunger rod which is connected at one end to lower end 54 of lever 52 and which is biased to the left by spring 55. Plunger rod 53 is connected to a plunger 56 at its other end.

Figure 3:
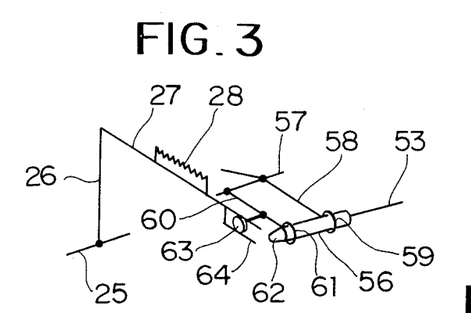
FIG. 3 is a perspective view showing a feed dog mechanism in a diagrammatic fashion.

FIG. 3 shows the operation of plunger 56. Plunger 56 is inserted in hole 59 formed at the free end of a link 58 which link is secured to vertical feed control shaft 57. Shaft 57 is rocked in synchronism with rotation of lower shaft 29 shown in FIG. 1. Plunger 56 has a tapered free end 62. As lever 52 in FIG. 2 is turned clockwise, plunger 56 is inserted into hole 61 which is formed at the end of a link 60. Link 60 is pivoted on vertical feed control shaft 57. On the other hand, as lever 52 is turned counterclockwise, plunger 56 is pulled out of hole 61. Link 60 has a lateral pin 63 which engages with fork 64 of base 27. Base 27 supports feed dog 28. One end of base 27 is pivotally connected to the upper end of link 26, which is swung by rocking shaft 25, horizontally reciprocating base 27 in synchronism with rotation of the sewing machine. It is therefore apparent that feed dog 28 reciprocates if plunger 56 is in hole 61 of link 62, and that feed dog 28 is dropped below needle plate 9 if plunger 56 is pulled out of hole 61. Fabric pressure selecting dial SB has a cam face (not shown) for moving follower 66 which is pivoted at point 65 to machine housing 1. Follower 66 has a pressure adjusting pin 67 and is moved by rotation of fabric pressure selecting dial SB to adjust the pressure of a pressure adjusting spring (now shown), to thereby control the pressure of presser bar 68. Follower 66 is also has a magnet 69 to open and close a reed switch 70 as dial SB is rotated stepwise, to command execution of basting stitches to the control circuitry. In the drawing, follower 66 is rotated fully clockwise, to close switch 70 and thereby call for basting stitches with minimum pressure of presser bar 68. Otherwise switch 70 will be opened.

Figure 4:
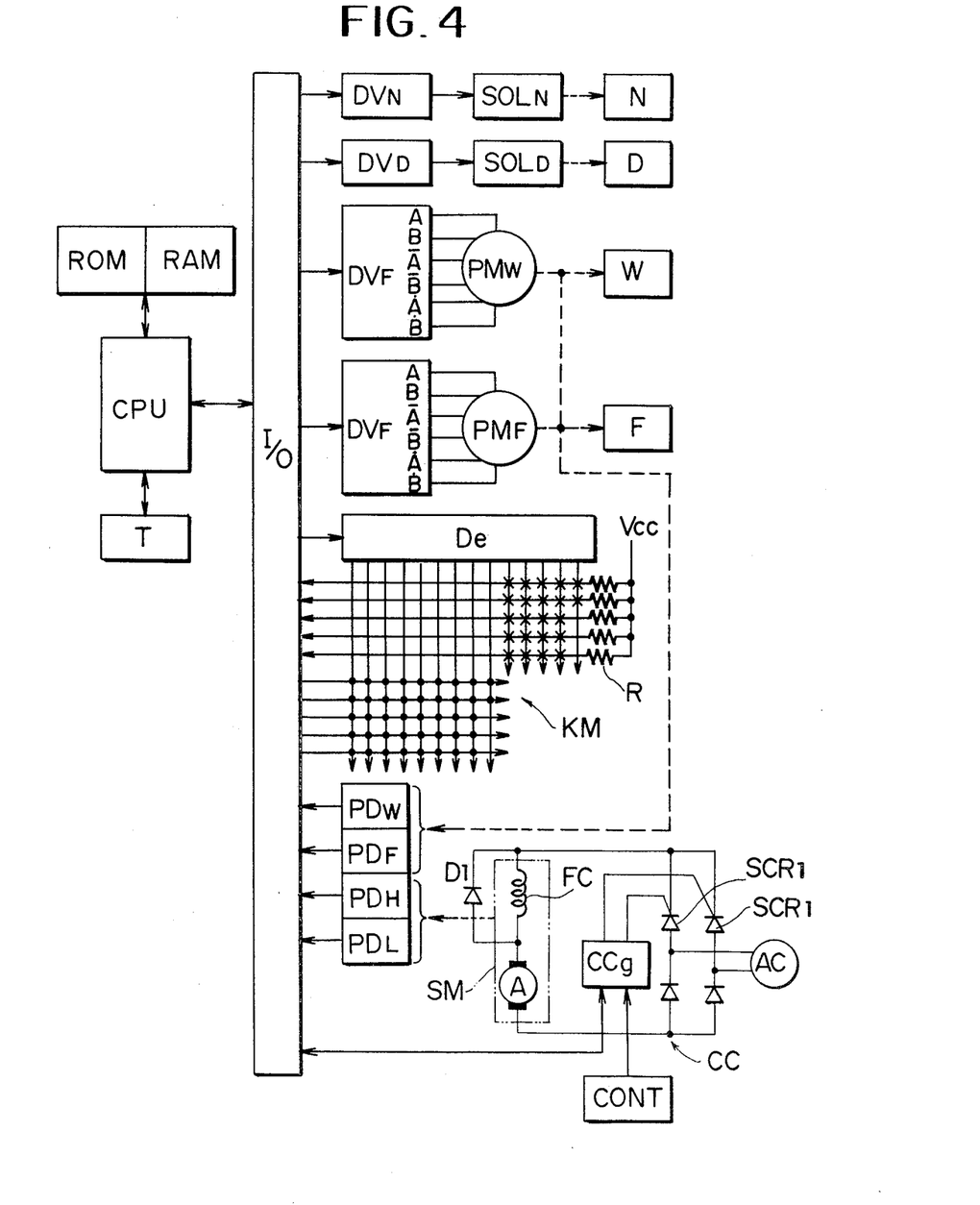
FIG. 4 is a block diagram of a control circuit utilized in the invention.

FIG. 4 shows the control circuit which is housed in housing CB. Connections shown with solid lines designate electrical connections, while arrow marks show directions of control. Mechanical connections are shown with dotted lines. ROM is a read-only-memory storing stitch data for forming stitch patterns selected by pattern selecting buttons (not shown) and also storing program control signals for executing programs. CPU is a central processing unit for carrying out program controls. RAM is a random-access-memory which temporalily stores a process or a result of the programs. T is a timer. I/O is an input-output port, and KM is a key matrix which reads out control signals operated by operating buttons (not shown) under the scanning control of CPU. $DV_W$ and $DV_F$ are pulse motor drive devices for controlling movement of the needle and fabric feed. Drive devices $DV_W$ and $DV_F$ are provided with pulse motor driving power sources, which, in response to commands from CPU, successively energize and deenergize one or both coils within needle swing pulse motor $PM_W$ and fabric feed pulse motor $PM_F$. Such energization and deenergization takes place in two directions and with a change in magnitude, in order to drive pulse motors $PM_W$ and $PM_F$ normally or in reverse. Pulse motor $PM_W$ operates needle swing mechanism W (which includes transmission rod 17) and pulse motor $PM_F$ operates fabric feed mechanism F (which includes fabric feed regulator 22). Position detectors $PD_W$, $PD_F$, detect rotational positions of pulse motors $PM_W$, $PM_F$. When a power source (not shown) is turned on to operate the control circuit in FIG. 4, position detectors $PD_W$ and $PD_F$ are read out by CPU to determine if they are operative (i.e., whether the pulse motors are at predetermined positions) or inoperative (i.e., whether the pulse motors are at other positions). CPU rotates the pulse motors $PD_W$, $PD_F$ to respective reset positions which are to be registered. Clutch solenoid $SOL_W$ (for changing the needle hole) is driven by driving device $DV_N$, which includes a power source. Prior to stitching, pulse motor $PM_W$ is driven to operate needle hole changing mechanism N, which includes switching lever 44. The clutch solenoid $SOL_D$ for engaging and disengaging the feed dog is driven by driving device $DV_D$ prior to stitching, and pulse motor $PM_F$ is driven to operate feed dog changing device D, which includes plunger 56. CC is a machine motor control circuit connected to a source AC, and drives machine motor SM in accordance with operation of controller CONT. Control circuit CC monitors the operation of controller CONT. CPU receives a detecting signal from control circuit CC and causes controller $CC_g$ to receive the speed control signal produced by operation of controller CONT. The basic principle of speed control CC is the same as described by the inventor here in Japanese Patent Application No. 42,178/78. During operation $PD_H$ delivers a signal to CPU indicating that the needle is at the upper position, so as to control the timing of pulse motor $PM_W$ and amplitude. Detector $PD_L$ delivers a signal to CPU indicating that the needle is at the lower position to control the timing of pulse motor $PM_F$. The reading-out of the stitch data from ROM is described in detail by the inventors here in Japanese Patent Application No. 124,306/75. ROM stores, in combination, stitch data composed of a needle swing control signal, a fabric feed control signal, and a next-address, which is to be read out by the same address signal. Each time CPU receives a signal from detector $PD_H$, it reads out the stitch data to store the stitch data in RAM for various calculations, and then transmits the next-address signal for the next stitch to ROM. The signal temporarily stored in RAM is instantly read out by the signal from detector $PD_H$, the fabric feed control signal is read out by the signal from detector $PD_L$, and pulse motors $PM_W$, $PM_F$ are driven. Either the needle amplitude control signal or the fabric feed control signal will not be required, depending upon the selected pattern and surplus space in ROM may be utilized to store stitch data for a different pattern. Other space in ROM may store stitch data commonly used for a plurality of patterns or for a single pattern, so that commonly used stitch data may be read out if required in accordance with commands from CPU. The details thereof is the same as described by the inventors here in Japanese Patent Application No. 131,015/78.

Figure 5:
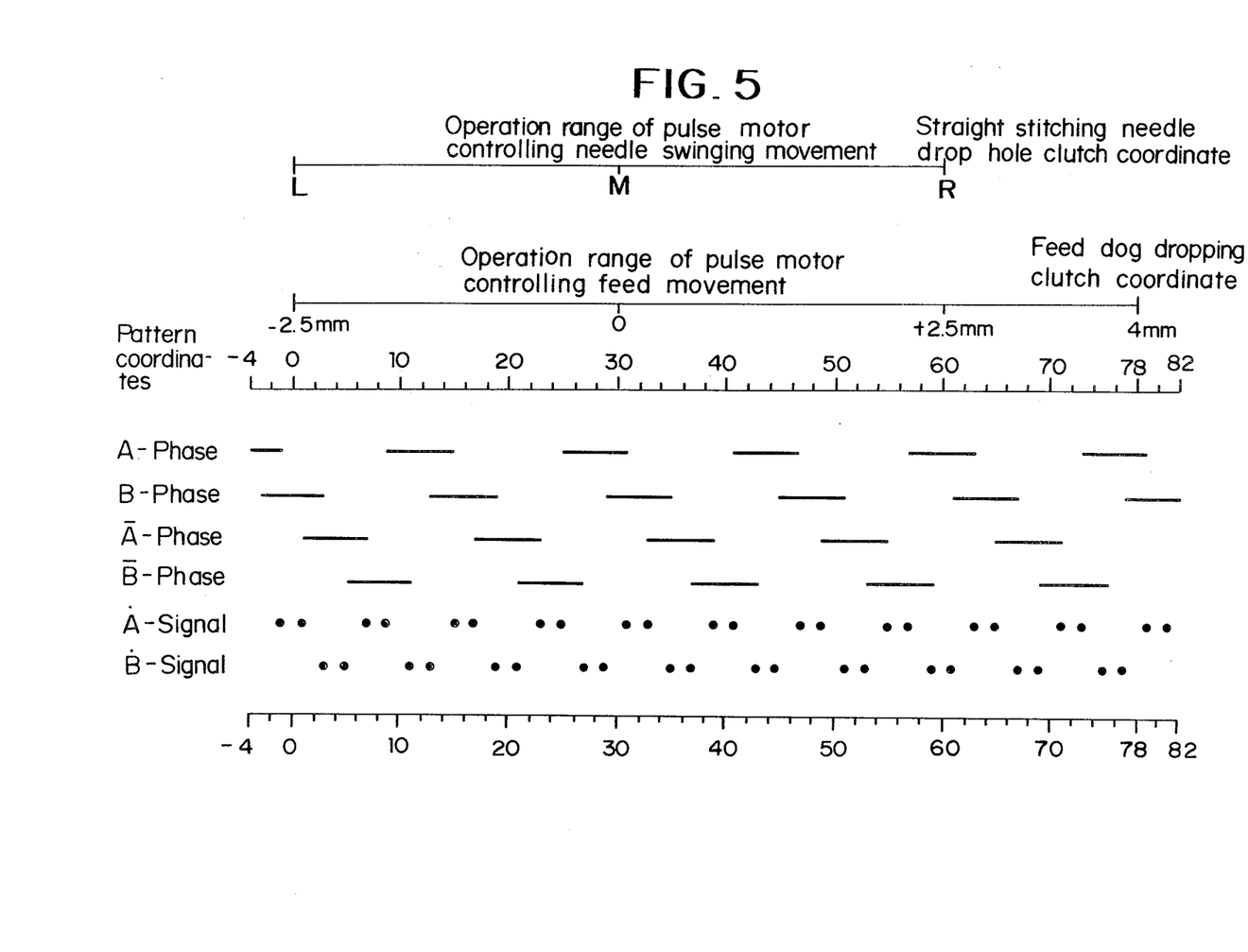
FIG. 5 is a graph showing the relationships between pattern coordinates and energization modes of the pulse motors.

FIG. 5 shows that operating range of pulse motor $PM_W$ (which controls needle amplitude) is from coordinate 0 to coordinate 60. Coordinate 0 corresponds to the leftmost position of the needle, coordinate 30 corresponds to the middle position of the needle, and coordinate 60 corresponds to the rightmost position of the needle. Coordinate 60 is a clutch coordinate for changing the needle hole 30. Needle dropping hole 30 is changed to a circular hole for straight stitching by energizing clutch solenoid $SOL_N$ at coordinate 60 and moving pulse motor $PM_W$ clutch solenoid $SOL_N$ at coordinate 60 and moving pulse motor $PM_W$ to coordinate 30. Needle hole 30 is changed to an oblong hole for zigzag stitching by moving pulse motor $PM_W$ to coordinate 60 from coordinate 30.

The operating range of pulse motor $PM_F$ for fabric feed is from coordinate 0 to coordinate 78. Coordinate 0 is a feed of $-2.5$ mm, coordinate 30 is a feed of 0 mm and coordinate 78 is a feed of 4 mm. Coordinate 78 is a clutch coordinate for changing feed dog 28. As in the case of changing needle hole 30, feed dog 28 is dropped by energizing clutch solenoid $SOL_D$ and moving pulse motor $PM_F$ to coordinate 0. When pulse motor $PM_F$ is returned to coordinate 78, the clutch is released and feed dog 28 is elevated.

Figures 6, 7:
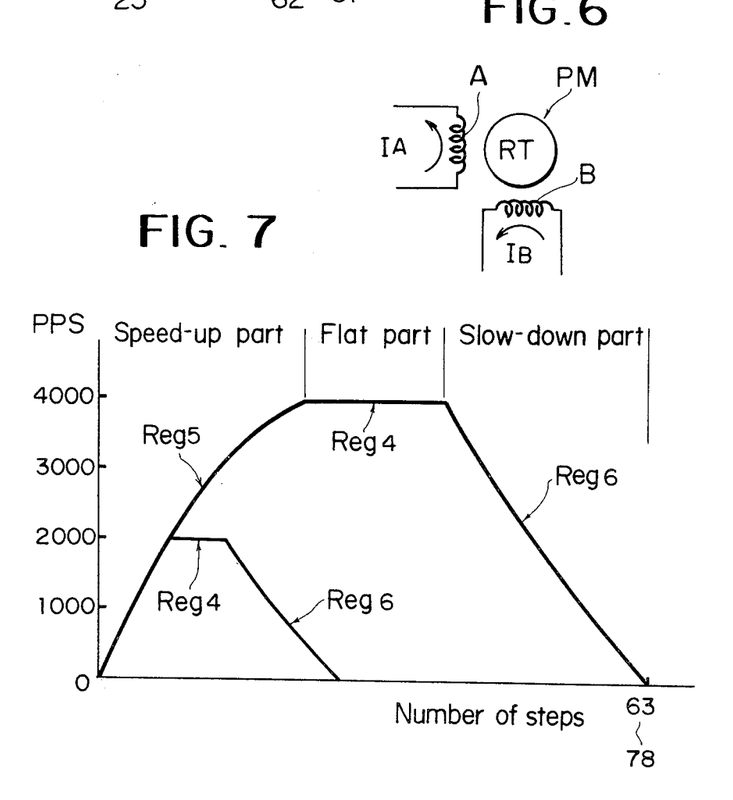
FIG. 6 is a sketch showing the windings in the pulse motors and the modes in which they may be energized.
FIG. 7 is a view showing the speed control curves of the pulse motors used in this invention.

Pulse motor PM, shown in FIG. 6, is automatically controlled by variable energizations of its windings. Pulse motor $PM_W$ and pulse motor $PM_F$ are of the type shown in FIG. 6. A and B are windings in pulse motor PM which are orthogonal to each other. Energization and deenergization of the windings and direction of current flow therein are controlled by plural semi-conductor switches (not shown). When electric current $I_A$ flows in the winding A as indicated by the arrow, $\overline{A}$-phase energization results, while when current flows in the opposite direction, $\overline{A}$-phase energization results. Similarly, with respect to winding B, $\overline{B}$-phase energization and B-phase energization indicate directions of current flow. A and B signals energize $A$-$\overline{B}$ phases in FIG. 5 with a smaller current, which is equal to full current multiplied by tan 22.5°, and further subdivided pattern coordinates which are obtained by combination of $A$-$\overline{B}$ phase energizations. As is apparent from FIG. 5, the same energizing phase of pulse motor PM is repeated each 16 pattern coordinates. These phases of energization are stored in ROM.

In FIG. 7, the ordinate indicates the pulses per second and the abscissa indicates the number of steps the pulse motor is to take. This latter number is the absolute value of the difference between the desired coordinate and the present coordinate.

The speed-up and slow-down sections shown in FIG. 7 have been obtained from actual experiments and calculations, and the time intervals of the energization for these curves are stored in ROM as time series codes.

For operating pulse motor $PM_W$ and pulse motor $PM_F$ 9 speed of 800 pps, which is their maximum speed, the corresponding energizing time intervals are stored as time codes in ROM.

Reg. 5, Reg 4 and Reg 6 respectively indicate registers which store the step numbers of pulse motor PM corresponding to speed-up section, the flat section and the slow-down section.

Operation of the invention as constructed above, will now be explained. The speed-up and slow-down sections are stored in ROM as energizing time intervals, that is, as counting values for setting a timer-counter which governs an interruption subroutine. The counting values are read out of ROM in accordance with the number of steps required of the pulse motor, PM, after changing energization phase of pulse motor PM, and the read-out starts the timer counter. When the timer counter overflows its count value, it interrupts the CPU to change pulse motor PM to the next energization phase, to repeat the operation once more. This operation is terminated when pulse motor PM is rotated to the desired coordinate, so that the desired coordinate and the present coordinate correspond.

Pulse motor PM is operated according to four modes, namely Mode 1 to Mode 4 depending upon the number of steps required to go from the present coordinate to a desired coordinate. The modes are shown in the Table below. With each of Modes, the slow-down section, speed-up section, and the flat section therebetween are used to drive pulse motor PM.

TABLE

| Modes | Steps | Curve Components |
|---|---|---|
| Mode 1 | 1–8 steps | Slow-Down Section |
| Mode 2 | 9–15 steps | Speed-Up and Slow-Down Sections are predetermined, and Flat Section varied by the number of steps. |
| Mode 3 | 16–63 steps | Speed-Up and Slow-Down Sections are used in proportion of ¾ of the steps, ¼ of which is devoted to Flat Section |
| Mode 4 | 64–78 steps | Speed-Up and Slow-Down Sections are the same as in the case of 63 steps and are adjusted by Flat section. |

Figure 8:
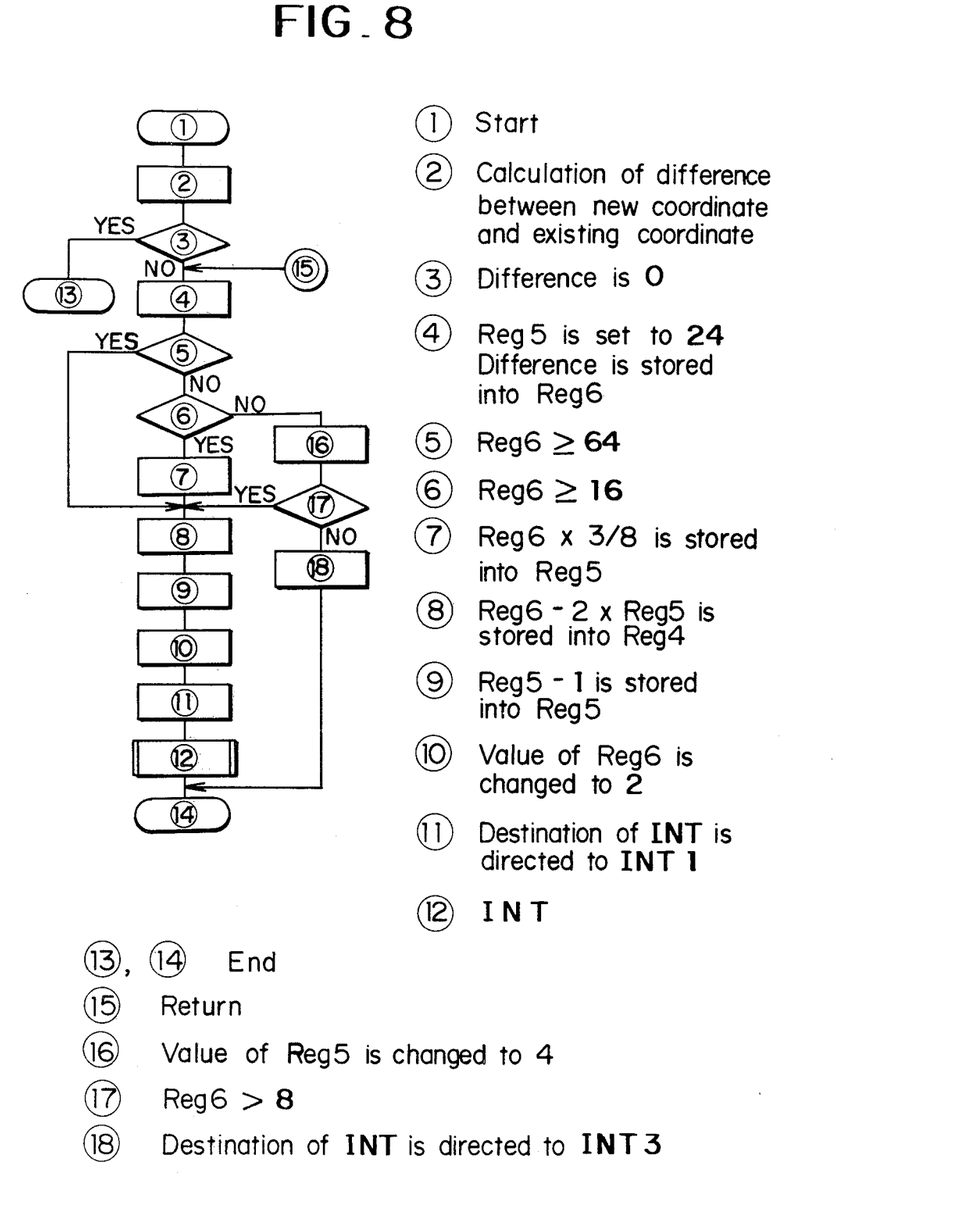
FIG. 8 is a flow chart showing pulse motor operation during stitching of patterns.

Reference will now be had to FIG. 8. When power source AC is turned on, each of the power sources in FIG. 4 is turned on and the program begins running in CPU. Each of the elements in FIG. 4, including pulse motors $PM_W$, $PM_F$ is reset. The process of setting pulse motors $PM_W$ and $PM_F$ to their initial reset positions is explained by the inventors here in Japanese Patent Application No. 27,951/78. If A-phase and $\overline{B}$-phase energizations are initially required there are two possible pulse motor positions available. If pulse motors $PM_W$ and $PM_F$ are set at any of these positions, detectors $PD_W$ and $PD_F$ are examined. Energization phases of pulse motors $PM_W$ and $PM_F$ are successively charged to rotate them in accordance with the program based on the outputs of $PD_W$ and $PD_F$ and pulse motors $PM_W$ and $PM_F$ are stopped at a specific one of the possible positions, or at either one of them. This is the reset coordinate of pulse motors $PM_W$ and $PM_F$.

Figure 10:
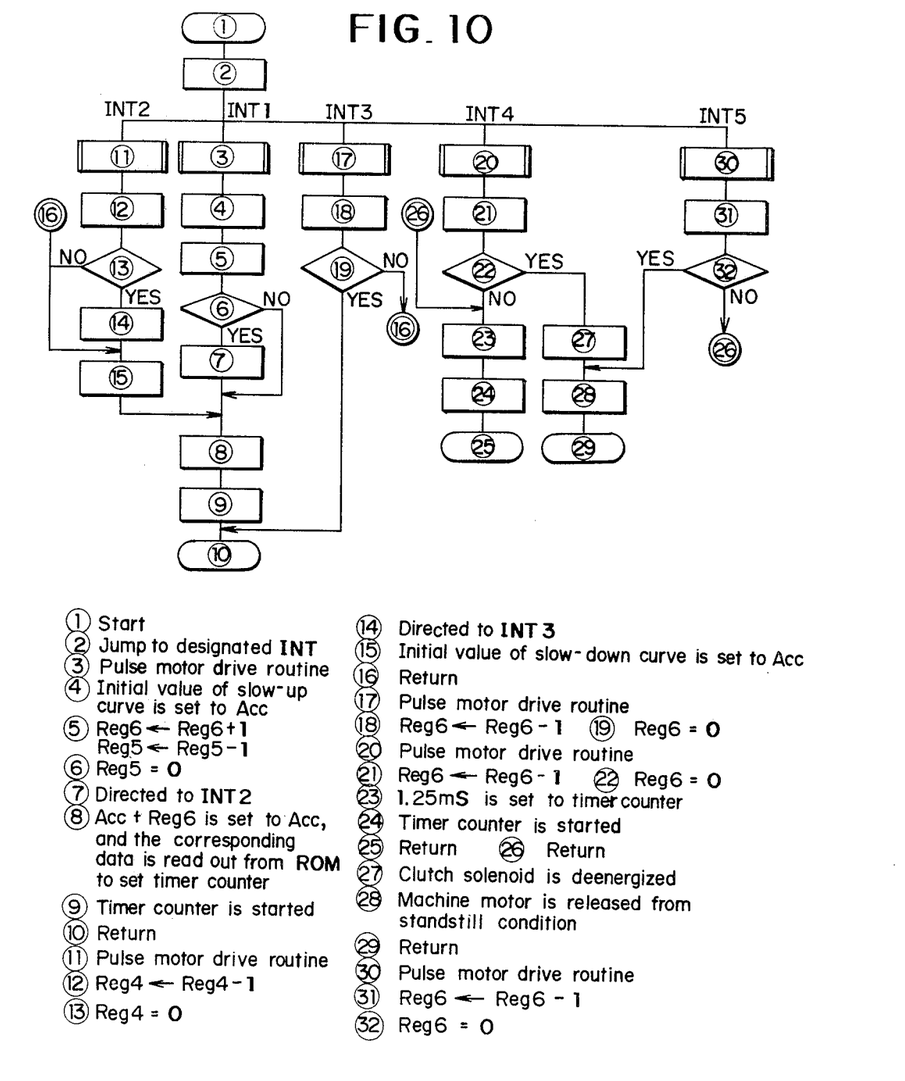
FIG. 10 is a flow chart showing the interruption subroutines to be performed at points in the flow charts shown in FIGS. 8 and 9.
Figure 11:
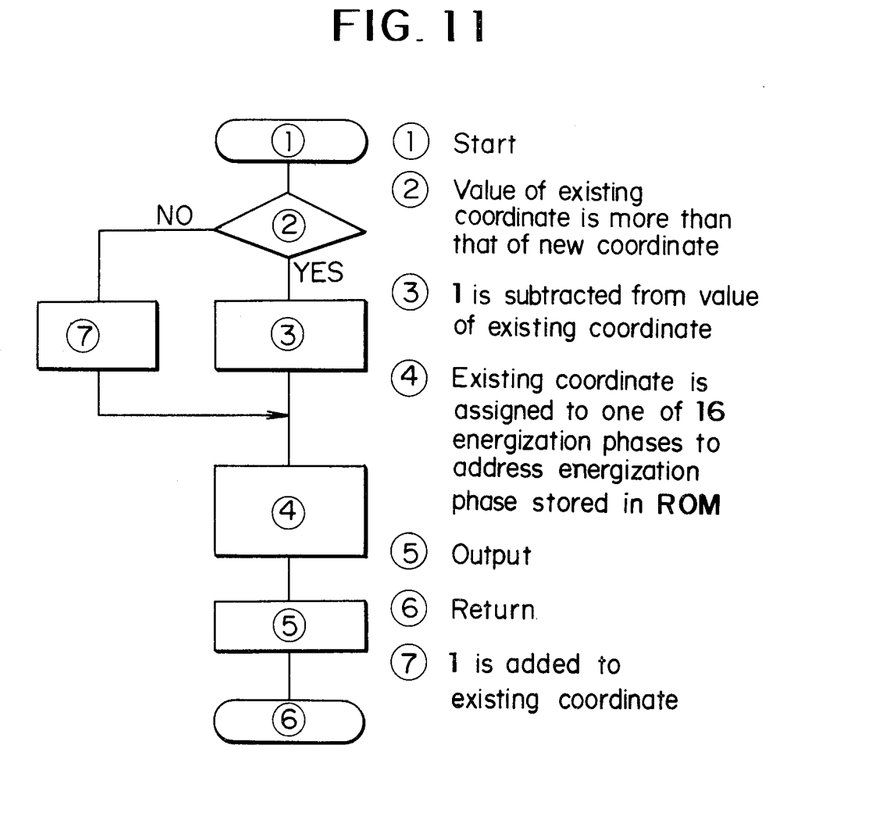
FIG. 11 is a flow chart showing the program used to drive the pulse motors.

In reference to FIGS. 8, 10 and 11, if a pattern selecting button is pushed to select a desired pattern and machine controller CONT is operated to start the sewing machine, the pulse motor control program in FIG. 8 is begun by a previously-generated signal from either position detector $PD_H$ or position detector $PD_L$. A calculation of the absolute value (the number of steps) of the difference between the reset coordinate of the pulse motors and the desired coordinate corresponding to the initial pattern data. Subsequently, the absolute value (the number of steps) of the difference between the desired coordinate corresponding to the new pattern data and the present coordinate corresponding to the selected pattern data is computed, and if the difference is 0, the program is ended and the pulse motors are not driven. If the absolute value of the difference (the number of steps) is not 0, the program is divided into the four modes as shown in the above Table in accordance with the remaining number of steps.

At first, 24 is registered in Reg 5 (register No. 5). Although the contents of Reg 5 are reduced to 23 by a later subtraction of 1, Reg 5 contains the number of steps in the slow-up curve when the number of steps is more than 64.

After storing the number of steps into Reg 6 (register No. 6) the program is divided into Mode 4 and Mode 3 by a determination of whether or not the contents of Reg 6 are greater than or equal to 64 and 16. If the contents of Reg 6 are less than 16, Mode 2 or Mode 1 is selected by whether or not such contents are greater than 8.

In Mode 1, that is, when the number of steps is 1 to 8, the program jumps to INT 3 (interruption subroutine No. 3), which includes a pulse motor driving routine. Pulse motor PM is thus energized. As the pulse motor PM approaches the desired coordinate step by step. Reg. 6 is repeatedly decremented by 1. As the contents of Reg 6 approach 0, INT 3 is repeatedly excuted in a loop with increasing intervening time intervals in accordance with the time series codes stored in ROM, including a program after a returning point shown by 16 in FIG. 10, and pulse motor PM is governed by the slow-down section of the speed control curve.

Initially, Acc (accumulator) contains an address of a destination which is an initial value of the slowdown section. Then the Acc is filled (at stage 8 in FIG. 10) with its own contents plus those of Reg 6, which sum is an address of the time series code for the slowdown section corresponding to the number of steps required. The time series code in ROM at this address is read out and is set as a count value in the time counter for the interruption subroutine and the time counter is started. When the timer counter overflows the count value, INT 3 is begun to move pulse motor PM to its next energization phase. This operation is repeatedly performed and pulse motor PM is rotated step by step to the desired coordinate. When Reg 6 contains 0, this operation is finished.

In Mode 2, that is, when the number of steps desired is 9 to 15, pulse motor PM is driven 3 steps along the speed-up section, is then driven along the flat section for a number of steps determined by the number of steps desired, and is finally driven 5 steps along the slow-down section.

In this case, the number of steps in the flat section is determined by the contents of Reg 4, which stores the calculated result (the contents of Reg 6-2) multiplied by the contents of Reg. 5. Thus, (Reg 6-2)×(Reg 5) is calculated and is stored in Reg 4. The number of steps due to the slow-up curve and the slow-down curve is amended in the next two processes. When pulse motor PM is driven along the speed-up section by INT 1 (interruption subroutine No. 1) until Reg. 5 contains 0. In subroutine INT 1, the initial value of the slow-up section is determined, and the address of the time series code is set by adding the contents of Acc to the contents of Reg 6 and storing the sum in Acc until Reg 5 contains 0. The address reads out the time series code for the slow-up section to progressively decrease the time interval in ROM, and the time series code is used as the count value in the timer counter for the interrupt subroutine. When the time counter overflows its count value, INT 1 is run once again, as in the case of Mode 1. When the timer counter overflows at stage 6 in FIG. 10, where Reg 5=0, the program goes to INT 2 (interruption subroutine 2), and the timer counter overflows at the fixed time interval until Reg 4 contains 0, while pulse motor PM is driven along the flat section. When the timer counter overflows at Reg 4=0, the program shifts to INT 3, and the same operation that takes place in Mode 1 is repeated until Reg 6 contains 0, so that pulse motor is driven along the slow-down section until Reg 6 contains 0, at which time the operation is finished.

In Mode 3, pulse motor PM is driven along the speed-up section, the flat section and the slow-down section as shown in FIGS. 8, 10 and 11. As shown in the Table above the number of steps in the speed-up section and the slow-down section is about ¾ of the entire number of steps, and in the remaining fourth pulse motor PM is driven along the flat section, of which the details have been omitted.

In Mode 4, number of steps in the speed-up section and the slow-down section is equal to the 63 steps in Mode 3 as shown in FIGS. 8, 10 and 11 and in the Table. The remaining steps are taken up by the flat section, the details of which have again been omitted.

Figure 9:
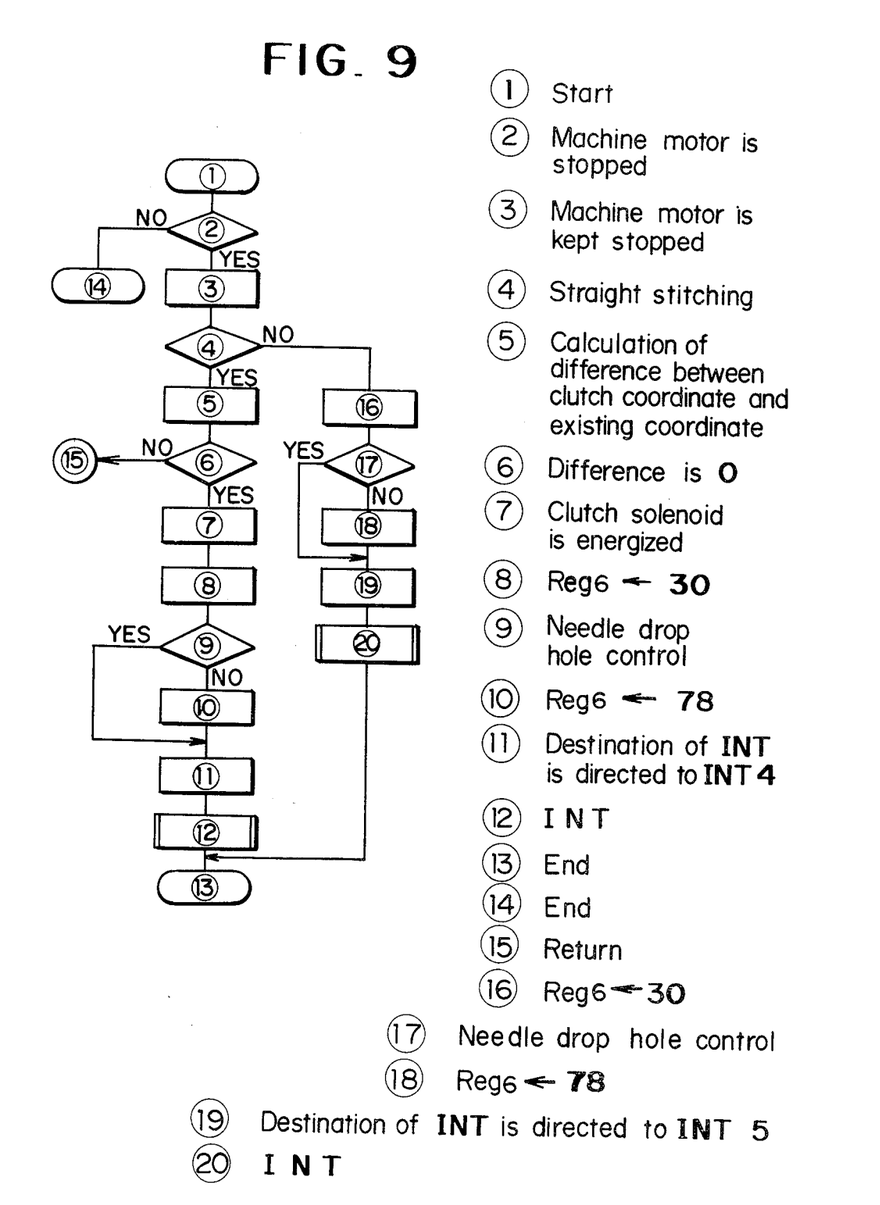
FIG. 9 is a flow chart showing pulse motor operation of the needle hole changing mechanism and the feed dog dropping mechanism.

The needle hole changing mechanism and the feed dog control mechanism will now be explained with reference to FIGS. 9, 10 and 11. Since both mechanisms operate in the same fashion, only the needle hole changing mechanism will be discussed, and a discussion of the feed dog changing mechanism will be omitted. When needle hole 30 is changed to a circular hole for straight stitching from the oblong hole for zigzag stitching by operation of a pattern selecting button, the signal lever from detector $PD_H$ changes from low to high. This indicates that needle swing may take place, and the program in FIG. 9 is initiated.

It is first determined whether or not the sewing machine motor is stopped. If not, no program is executed. If so, it is determined whether or not straight stitching is selected.

If straight stitching is selected, the difference between clutch coordinate 60 (for the circular hole) and the existing coordinate of pulse motor $PM_W$ is computed. If the difference is not 0, the operation of pulse motor $PM_W$ takes place according to the four modes in accordance with the number of steps required, as in the flow chart in FIG. 8. Pulse motor $PM_W$ is thus driven to clutch coordinate 60. Clutch solenoid $SOL_N$ (for changing the needle hole) is then energized and pin 39 (shown in FIG. 2) engages link 15 to transmit the rotation of pulse motor $PM_W$ to arm 31.

After 30 is stored in Reg 6, the program jumps to INT 4 (interruption program No. 4). Pulse motor $PM_W$ is driven step by step at the rate of 800 pps (i.e. each time the time counter overflows 1.25 mS) from clutch coordinate 60 to coordinate 30 (middle position of the needle) until Reg 6 contains 0. Rotation of pulse motor $PM_W$ turns arm 31 clockwise, and thus lever 36 is turned counterclockwise against tension spring 37. Therefore, lever 44 is turned clockwise by intermediate lever 40. Lever 44 is provided with an auxiliary plate (not shown) at its free end. As a result, the auxiliary plate is advanced toward the elongated needle hole 30 in needle plate 9 for zigzag stitching, and partly covers needle hole 30, leaving a circular hole for straight stitches.

When Reg 6 becomes 0, clutch solenoid $SOL_N$ is deenergized. Arm 31 is constrained to move away from pulse motor $PM_W$ even if solenoid $SOL_N$ is deenergized, and arm 31 is kept engaged with pulse motor $PM_W$. Needle hole 30 is maintained in a circular shape for straight stitching, and the pulse motor remains at coordinate 30 due to the selection of straight stitches. Needle bar 5 is maintained at its basic center line.

Machine motor SM is then allowed to move for sewing straight stitches.

Operation of the needle hole changing mechanism will be explained, assuming a change to zigzag stitching from straight stitching.

When needle hole 30 is changed from straight stitching to zigzag stitching by operation of a pattern selecting button, the level of the signal from detector $PD_H$ changes from low to high. This indicates that needle swing may take place, and the program in FIG. 9 is begun.

It is first determined whether or not machine motor SM is stopped. If it is not, the program is finished. If so, it is next determined whether or not straight stitching is selected.

Since zigzag stitching is here selected, the desired coordinate is converted to clutch coordinate 60, and the existing coordinate 30 is simultaneously stored into Reg 6. Then the program jumps to INT 5 (interruption subroutine No. 5), and pulse motor $PM_W$ is driven step by step at a rate of 800 pps (i.e. each time the counter timer overflows 1.25 mS) from coordinate 30 to clutch coordinate 60, until Reg 6 contains 0. With rotation of pulse motor $PM_W$, switching arm 31 is turned counterclockwise. Therefore, lever 36 is turned clockwise and lever 44 is then turned counterclockwise by intermediate lever 40. As a result, the auxiliary plate (now shown) at the free end of lever 44 is displaced from the elongated needle hole 30 in needle plate 9. Thus, the circular hole for straight stitching is changed to an elongated hole for zigzag stitching.

When Reg 6 contains 0, pulse motor $PM_W$ is positioned at clutch coordinate 60, switching arm 31 is released to move away from the pulse motor in FIG. 2, and pin 39 is disengaged from link 15. The load on pulse motor $PM_W$ is only that of the needle bar mechanism connected to the transmission rod 17, and needle hole 30 is maintained in an oblong shape for zigzag stitching by means of spring 47 which biases lever 44 counterclockwise.

After machine motor SM is allowed to move, zigzag stitching may be produced according to stitch data in ROM.

As mentioned above, this invention varies the speed of a pulse motor in accordance with the distance it is required to move. Basically, the speed control follows a generally trapezoidal curve formed by a speed-up section, a flat section, and a slow-down section. The relatively light load on the motor during stitching and the matching of low pulse motor speed and maximum pulse motor output with the relatively heavy load caused by operating the needle hole changing mechanism and the feed dog dropping mechanism, permits use of pulse motors which can be housed in the small space within machine housing.

We claim:

1. An improvement to a sewing machine in which a pulse motor is subjected to a lesser load during straight stitching and to a greater load during a movement of a mechanism from an initial first mechanism position to a desired second mechanism position, comprising:
   a first means connected to the mechanism and determining the first mechanism position;
   a second means determining the second mechanism position in accordance with user requirements;
   a third means connected to the first means and the second means and computing position difference information which is used to operate the pulse motor to allow the movement to take place; and
   a motor control connected to the third means and to the pulse motor, the motor control regulating motor speed in accordance with the difference information.

2. The improvement defined by claim 1, wherein the motor control regulates motor speed in accordance with a generally trapezoidal curve.

3. The improvement defined by claim 2, wherein the generally trapezoidal curve includes a speed-up section and a slow-down section.

4. The improvement defined by claim 3, wherein the generally trapezoidal curve further includes a flat section.

* * * * *